United States Patent
Oltheten et al.

(10) Patent No.: US 11,623,736 B2
(45) Date of Patent: Apr. 11, 2023

(54) COLLECTIVE CONTROL STICK MOUNTED THROTTLE CONTROL ASSEMBLY

(71) Applicant: Textron Innovations Inc., Providence, RI (US)

(72) Inventors: Erik Oltheten, Fort Worth, TX (US); Darren Gregory Lang, Dallas, TX (US); Charles Eric Covington, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 25 days.

(21) Appl. No.: 17/336,264

(22) Filed: Jun. 1, 2021

(65) Prior Publication Data
US 2022/0033064 A1 Feb. 3, 2022

Related U.S. Application Data

(60) Provisional application No. 63/058,298, filed on Jul. 29, 2020.

(51) Int. Cl.
*B64C 13/04* (2006.01)

(52) U.S. Cl.
CPC .................. *B64C 13/0421* (2018.01)

(58) Field of Classification Search
CPC ................................. B64C 13/0421
See application file for complete search history.

(56) References Cited

U.S. PATENT DOCUMENTS

| | | | | |
|---|---|---|---|---|
| 2009/0012659 A1* | 1/2009 | McMahon | .......... | B64C 13/0421 244/236 |
| 2013/0206900 A1* | 8/2013 | Yates | .................... | B64C 27/56 74/523 |
| 2014/0091181 A1* | 4/2014 | Ouellette | ............... | G05G 13/00 244/221 |
| 2017/0113783 A1* | 4/2017 | Scofield | ............. | B64C 13/0421 |
| 2018/0251214 A1* | 9/2018 | Lavallee | ................ | B64D 31/04 |

FOREIGN PATENT DOCUMENTS

EP  3381799 B1  5/2020

OTHER PUBLICATIONS

European Search Report in related European Patent Application No. 21188373.1 dated Dec. 16, 2021, 4 pages.
European Exam Report in related European Patent Application No. 21188373.1 dated Jan. 5, 2022, 6 pages.

* cited by examiner

*Primary Examiner* — Rodney A Bonnette
(74) *Attorney, Agent, or Firm* — Lightfoot & Alford PLLC

(57) ABSTRACT

An aircraft includes an electronically controlled engine (ECE) and a first and a second throttle control assembly. The first throttle control assembly includes a first throttle fly button configured to command a FLY mode and a first throttle idle button configured to command an IDLE mode. The second throttle control assembly includes a second throttle fly button configured to command the FLY mode and a second throttle idle button configured to command the IDLE mode.

20 Claims, 8 Drawing Sheets ized and shaped to receive a portion of CCS 116 generally coaxially within handle 204.

COLLECTIVE CONTROL STICK MOUNTED THROTTLE CONTROL ASSEMBLY

CROSS-REFERENCE TO RELATED APPLICATIONS

This application claims priority to U.S. Provisional Patent Application No. 63/058,298, filed on 29 Jul. 2020 by Erik Oltheten, et al., and titled "COLLECTIVE CONTROL STICK MOUNTED THROTTLE CONTROL ASSEMBLY," the disclosure of which is incorporated by reference in its entirety.

STATEMENT REGARDING FEDERALLY SPONSORED RESEARCH OR DEVELOPMENT

This invention was made with Government support under Agreement No. W911W6-19-9-0002, awarded by the Army Contracting Command-Redstone Arsenal. The Government has certain rights in the invention.

BACKGROUND

Some helicopters include collective control sticks comprising a continuously variable throttle control. In some cases, the throttle control comprises a twist grip assembly disposed near an end of the collective control stick. In some embodiments, where a helicopter is configured to allow more than one pilot, the helicopter sometimes comprises two collective control sticks, one for each pilot. In cases where there are two collective control sticks, the twist grip assemblies of the collective control sticks are mechanically interconnected so that movement of one twist grip assembly results in substantially similar movement of the other twist grip assembly. However, the twist grip assembly and the mechanical interconnections between the multiple twist grip assemblies are expensive to manufacture and account for additional weight that the helicopter must carry, thereby reducing an overall efficiency and/or payload capacity of the helicopter.

DETAILED DESCRIPTION

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
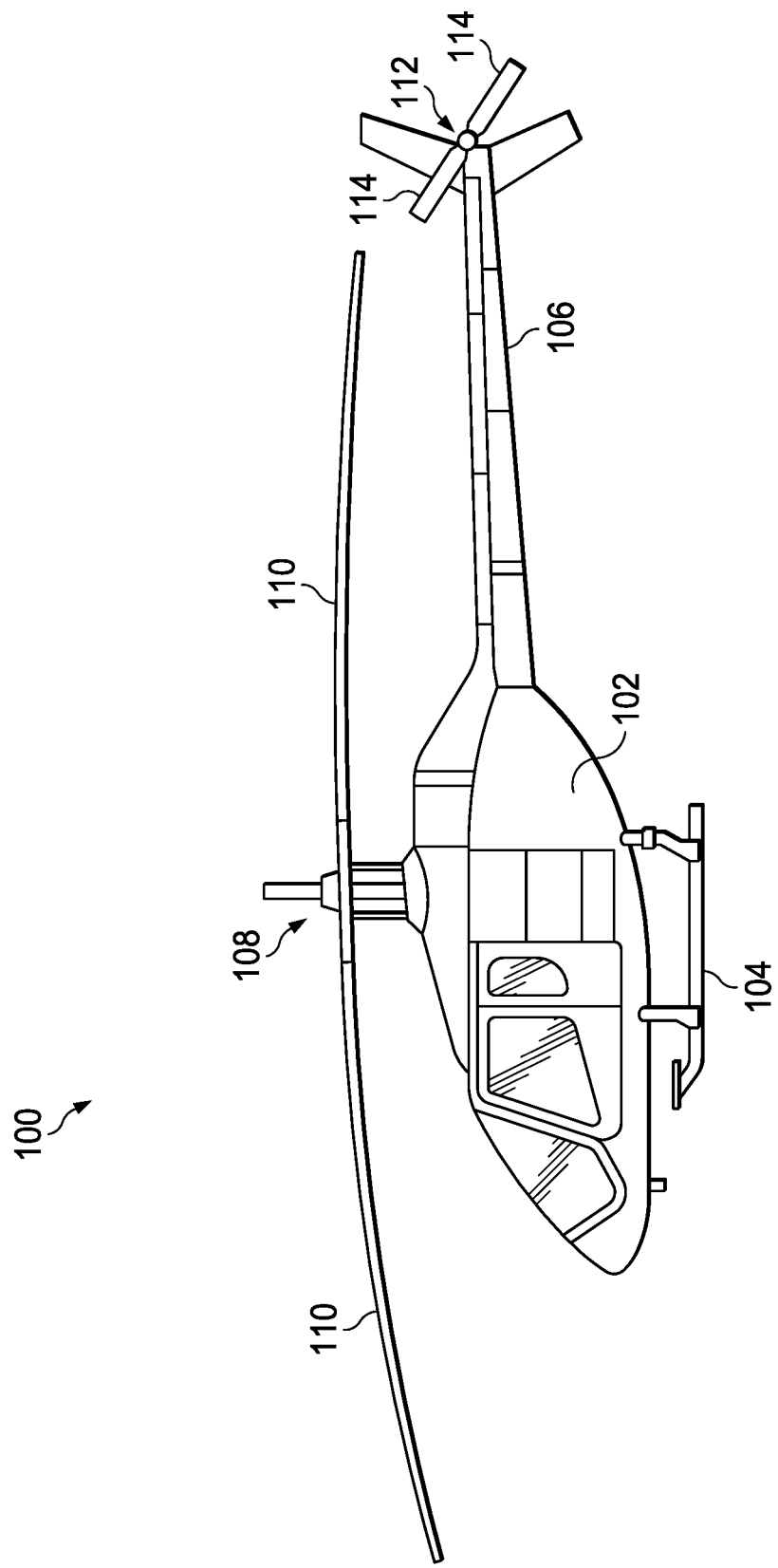
FIG. 1 is an orthogonal left side view of an aircraft according to an embodiment of this disclosure.
Figure 2:
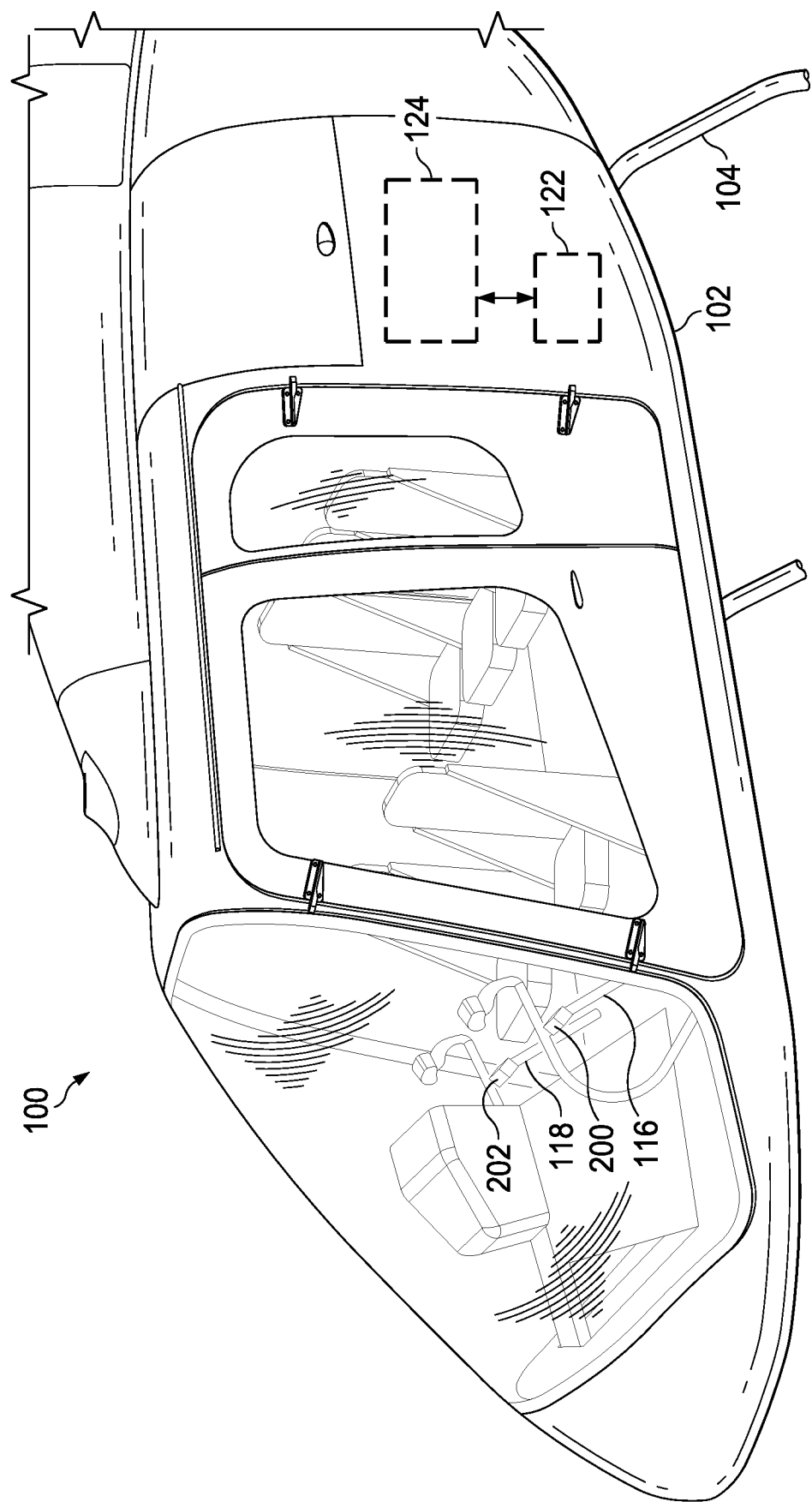
FIG. 2 is a partial oblique left side view of the aircraft of FIG. 1 showing a cockpit of the aircraft of FIG. 1 in greater detail.

Referring to FIGS. 1-2 in the drawings, an aircraft 100 is illustrated. Specifically, FIGS. 1-2 illustrate aircraft 100 as a helicopter, however one with skill in the art will understand that in other embodiments, aircraft 100 can be another type of aircraft, such as a tilt-rotor aircraft. Helicopter 100 can include a fuselage 102, a landing gear 104, a tail member 106, a main rotor system 108 comprising main rotor blades 110, and a tail rotor system 112 comprising tail rotor blades 114. The main rotor blades 110 and the tail rotor blades 114 can be rotated and selectively controlled to selectively control direction, thrust, and lift of helicopter 100.

Referring now to FIG. 2, helicopter 100 further comprises a first collective control stick (CCS) 116 that carries a first throttle control assembly (TCA) 200 and a second CCS 118 that carries a second TCA 202. Most generally, the CCSs 116, 118 are configured to control pitch angle of all the main rotor blades 110 collectively, thereby controlling a total lift derived from the main rotor system 108. TCA 202 is substantially similar to TCA 200 and generally comprises substantially the same components.

Although FIG. 2 illustrates that helicopter 100 comprises two CCSs 116, 118 and two TCAs 200, 202, in some embodiments, helicopter 100 can comprise only a single CCS 116 and a single TCA 200. That is to say, in some embodiments, helicopter 100 includes CCS 116 and TCA 200, but does not include CCS 118 and TCA 202.

Figure 3:
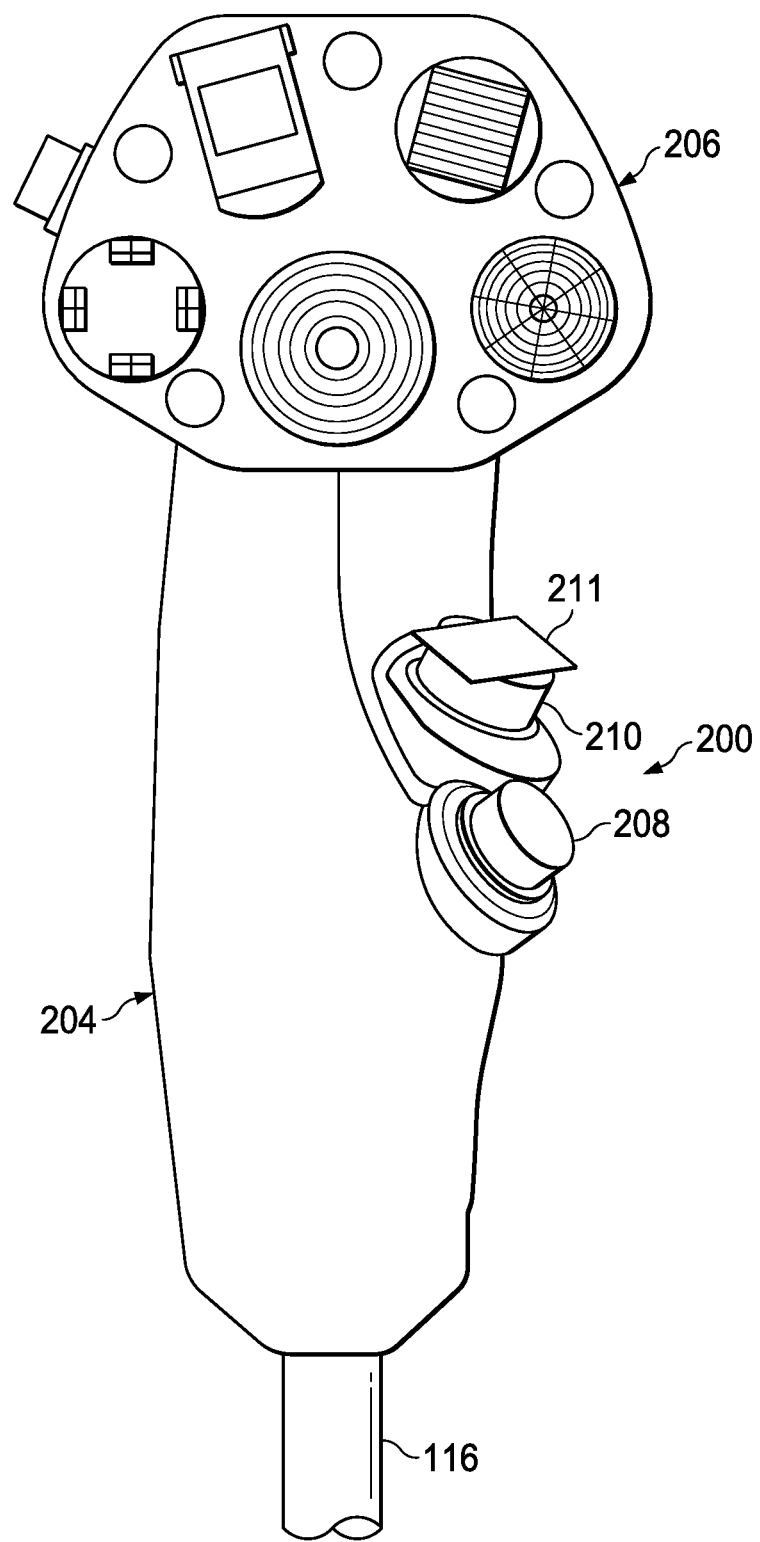
FIG. 3 is an orthogonal front view of a collective control stick mounted throttle control assembly according to an embodiment of this disclosure.
Figure 4:
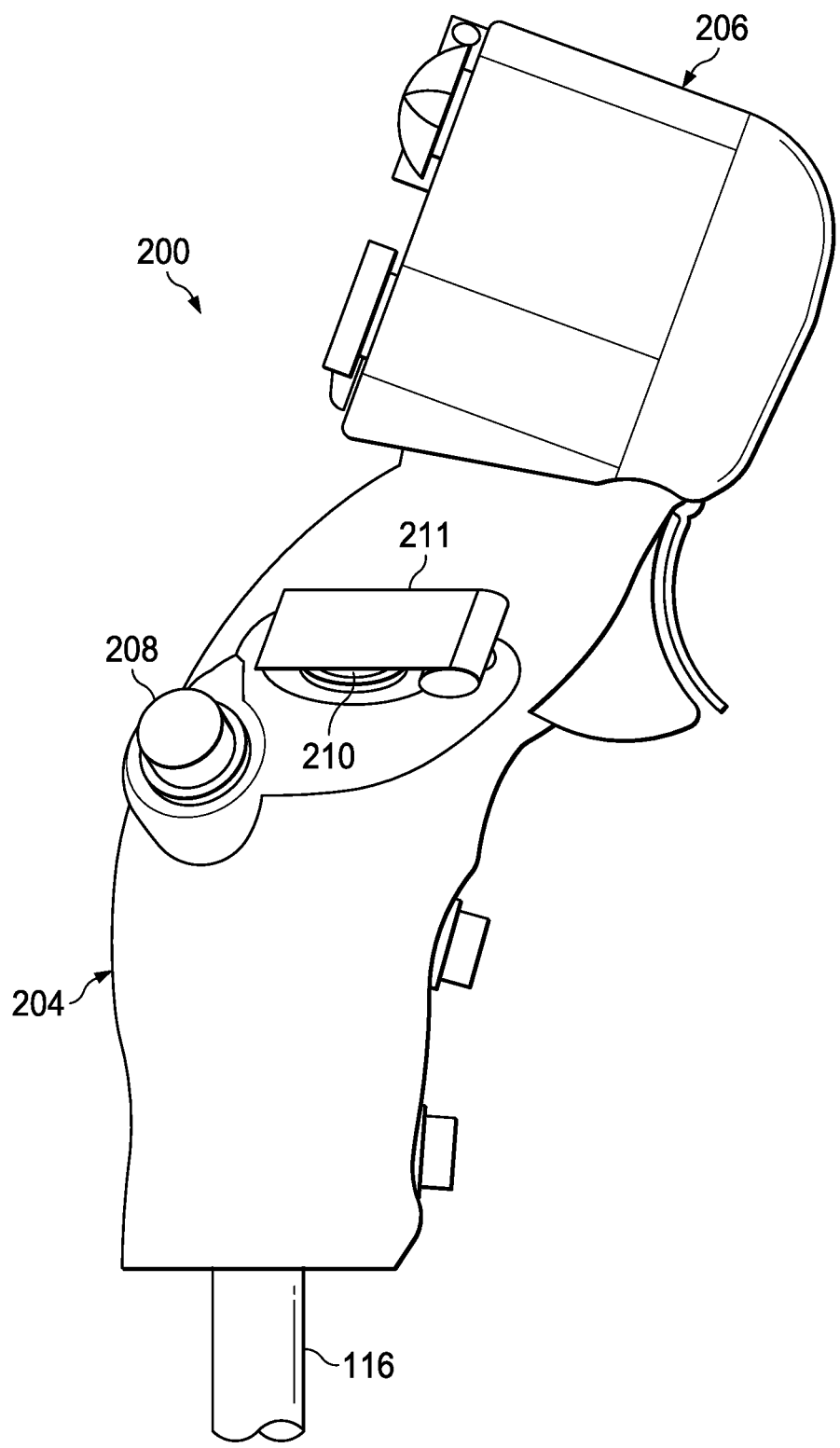
FIG. 4 is an orthogonal side view of the collective control stick mounted throttle control assembly according to an embodiment of this disclosure.

Referring now to FIGS. 3 and 4, CCS 116 carrying TCA 200 is shown. TCA 200 generally comprises a handle 204 connected to CCS 116 and a head 206 connected to a distal end of the handle 204. The handle 204 is generally sized and shaped to receive a portion of CCS 116 generally coaxially within handle 204.

In this embodiment, each of the TCA 200 and 202 comprises a throttle fly button (TFB) 208 and a throttle idle button (TIB) 210. A pilot can manipulate the TFB 208 and/or the TIB 210 with a thumb while still grasping the handle 204 with fingers. In some cases, the TFB 208 of TCA 200 can be referred to as a Pilot 1 TFB and the TIB 210 of TCA 200 can be referred to as a Pilot 1 TIB. Similarly, the TFB 208 of TCA 202 can be referred to as a Pilot 2 TFB and the TIB 210 of TCA 202 can be referred to as a Pilot 2 TIB. In some embodiments, TFB 208 and TIB 210 are depressible buttons configured to be pressed by a pilot such that TFB 208 and TIB 210 depresses when pressed. Accordingly, TFB 208 and TIB 210 resist depression with a certain resisting force. In some embodiments, TFB 208 and TIB 210 resist depression with a same resisting force. In some embodiments, TFB 208 and TIB 210 resist depression with different resisting forces. For example, in some embodiments, TFB 208 resists depression with a first resisting force and TIB 210 resists depression with a second resisting force greater than the first resisting force. TFB 208 and TIB 210 resisting depression with different forces can allow a pilot to confirm which button she is activating by the force required to press the button rather than having to look down to visually confirm which button she is pressing. TCA 200, 202 further includes a guard 211 hingedly coupled to TCA 200, 202 to selectively restrict access to TIB 210 such that the pilot must rotate guard 211 about its hinge away from TIB 210 to access to TIB 210.

Although the figures illustrate TFB 208 and TIB 210 carried by TCA 200 of CCS 116, one with skill in the art will recognize that TFB 208 and TIB 210 can be carried by other parts of the helicopter 100. For example, TFB 208 and TIB 210 can be virtual buttons presented on a touch-screen display of helicopter 100 that Pilot 1 or 2 may use to control helicopter 100. Additionally, one with skill in the art will understand that in some embodiments, TFB 208 and TIB 210 are not carried by helicopter 100. For example, in some embodiments, TFB 208 and TIB 210 can be part of a device that remotely controls the operation of helicopter 100.

Unlike conventional helicopters, the helicopter 100 comprises a single electronically controlled engine 124, multiple pilot control channels (one for each of the TCA 200 and TCA 202), and an electronic controller 122 (configured to receive control inputs from the TCA 200 and TCA 202). Controller 122 is configured to receive control inputs from TCA 200 and 202, along with other inputs from various components of helicopter 100, to control the operation of engine 124. In some embodiments, controller 122 can be a full authority digital engine control (FADEC). In alternative embodiments, more than two pilot control channels could be provided (requiring additional TCAs). Also, in alternative embodiments, multiple engines can be provided and controlled in a manner like that described above with regard to the single engine 124.

Like many other pushbuttons, TFB 208 and TIB 210 may experience button "bouncing" when pressed by the pilot due to oscillations in the button that occur when the button is moved to a new position to strike the corresponding contact. TFB 208 and TIB 210 may incorporate additional debouncing hardware to prevent such bouncing. Additionally or alternatively, controller 122 may incorporate debouncing software that accounts for the button bouncing when interpreting activations of TFB 208 and TIB 210.

The systems and methods disclosed herein provide for selectively transitioning an engine such as engine 124 between an IDLE mode where the engine is throttled down to a low idle speed that is suitable for autorotation and FLY mode in which the engine is operated at a speed supportive of obtaining or maintaining flight. The TCAs 200, 202 allow multi-pilot control without conflict regarding which of the IDLE and FLY modes should be enforced.

The systems and methods disclosed herein also multiplex functions to reduce button count, namely, the TFBs 208 being used to cycle through a full power FLY mode setting and one or more reduced power FLY mode settings. The systems disclosed also provide protection from inadvertent IDLE mode selection and the TIBs 210 buttons bring an engine from FLY mode to IDLE mode. As discussed in greater detail below, the TFBs 208 bring engine to FLY mode from IDLE mode. Once in FLY mode at full power, a subsequent press of the TFBs 208 will cycle to a next of one or more FLY mode power settings that are less than full power FLY mode.

The systems and methods disclosed herein particularly lend themselves to use in a tandem cockpit where either pilot can change the engine from IDLE mode to FLY mode. A reason for having the control on the collective is for quick reduction to idle power which is critical in the event of a loss of antitorque (tail rotor 112). Prior helicopters have had switches on the collective to rapidly go to idle, but when inadvertently activated, the means of recovery to "fly" requires the pilot release the collective and use other cockpit controls. Other helicopters have required a second, held press of the idle switch to restore the engine to FLY mode.

In this disclosure, systems and methods are provided so that both the command to enter IDLE mode and the command to enter FLY mode are available on the collective with easy access. The command to IDLE mode can be made distinct by using a switch or TIB 210 with higher force action as compared to a TFB 208, and/or the addition of guard 211 that the pilot has to get his/her thumb under to assure the action is intentional. If, in spite of these measures, the TIB 210 is inadvertently pressed, recovery to the FLY mode is accomplished by pressing the adjacent TFB 208. As will be described in greater detail below, if both pilots press their TFBs 208 for recovery to FLY mode at the same time, they will not cancel each other out. The intended action is clear because a toggling action is not used. The same applies to a command to enter IDLE mode. There is no command confusion by both pilots commanding IDLE mode so there is a far less chance of an incorrect or unintentional command.

The limited availability of switches on the collective (which is typical) is solved by also using the TFB 208 to also cycle through automatic limiting functions. When initially going to FLY mode, and while at normal power settings, the system can normally default to the highest automatic limiting setting (absolute parameter limits) so maximum power is available for any unforeseen events. As will be described below, if desired, pressing the TFB 208 again cycles to limit power to specific ratings. The use of the same TFB 208 for both functions (transition to FLY mode and cycling through limit selections) is useful because transition to FLY mode traditionally defaults the limit selection and causes no additional complication from previous systems where FLY mode and power limiting selection were accomplished using separate buttons.

As will be discussed in greater detail below, in some embodiments, TFB 208 button presses take precedence over TIB 210 button presses so that FLY mode takes precedence over IDLE mode. In some embodiments, continually depressing a TFB 208 will always result in FLY mode. In some embodiments, a deliberate press of a TIB 210 can be required wherein the deliberate nature of the button press is determined by requiring the button be pressed for a minimum amount of time, such as, but not limited to, 0.25 second. In this manner, an inadvertent TIB 210 button press can be prevented from commanding the IDLE mode. It is important to note that there are alternative means available to remove power from the main engine if required (RUN/STOP, Fire Fuel Shutoff).

In some cases, the helicopter may have no rapid start capability and with no auto-start, a RUN->FLY->START sequence can be utilized. In some cases, a FLY Switch or button can reset a stuck NR_REF<100%, such as if stuck at 91% NR, FLY switch can reset controller NR_REF to 100%. In some cases, indication of conflicting FLY/IDLE mode requests between crewstations can be provided.

Figure 5:
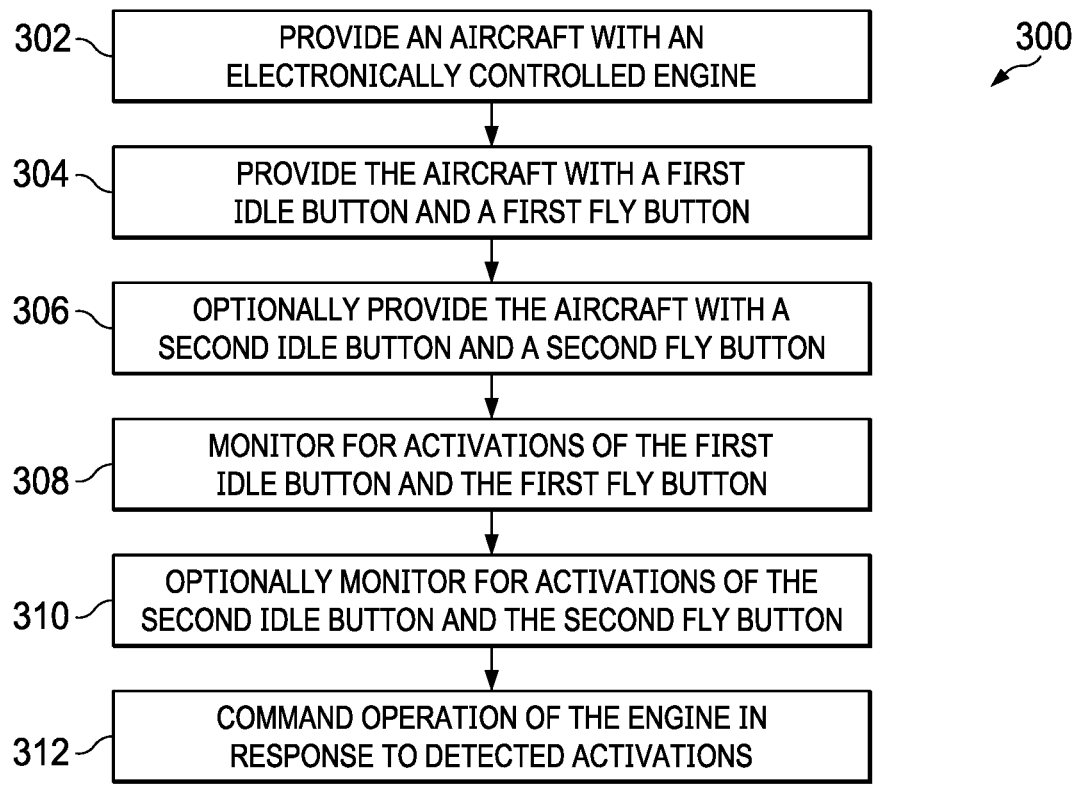
FIG. 5 is a flowchart illustrating a method of operating an aircraft according to an embodiment of this disclosure.

Referring to FIG. 5, a method 300 of operating helicopter 100 will be described. At block 302, method 300 can begin by providing helicopter 100 with a electronically controlled engine (ECE), such as engine 124 electronically controlled by controller 122. At block 304, method 300 can continue by providing helicopter 100 with a first throttle fly button and a first throttle idle button, such as TFB 208 and TIB 210 carried by TCA 200. At block 306, method 300 can optionally continue by providing helicopter 100 with a second throttle fly button and a second throttle idle button, such as TFB 208 and TIB 210 carried by TCA 202. At block 308, method 300 can continue by controller 122 detecting activation of TFB 208 and TIB 210 of TCA 200. At block 310, in embodiments where helicopter includes TCA 202, method 300 can continue by controller 122 additionally detecting activation of TFB 208 and TIB 210 of TCA 202. At block 312, method 300 can continue by controller 122 commanding the operation of engine 124 based on the detected activations. As will be described in greater detail, controller 122 can command engine 124 to perform IDLE mode or FLY mode based on the detected activations of TFBs 208 and TIBs 210 of TCAs 200 and 202.

Figure 6:
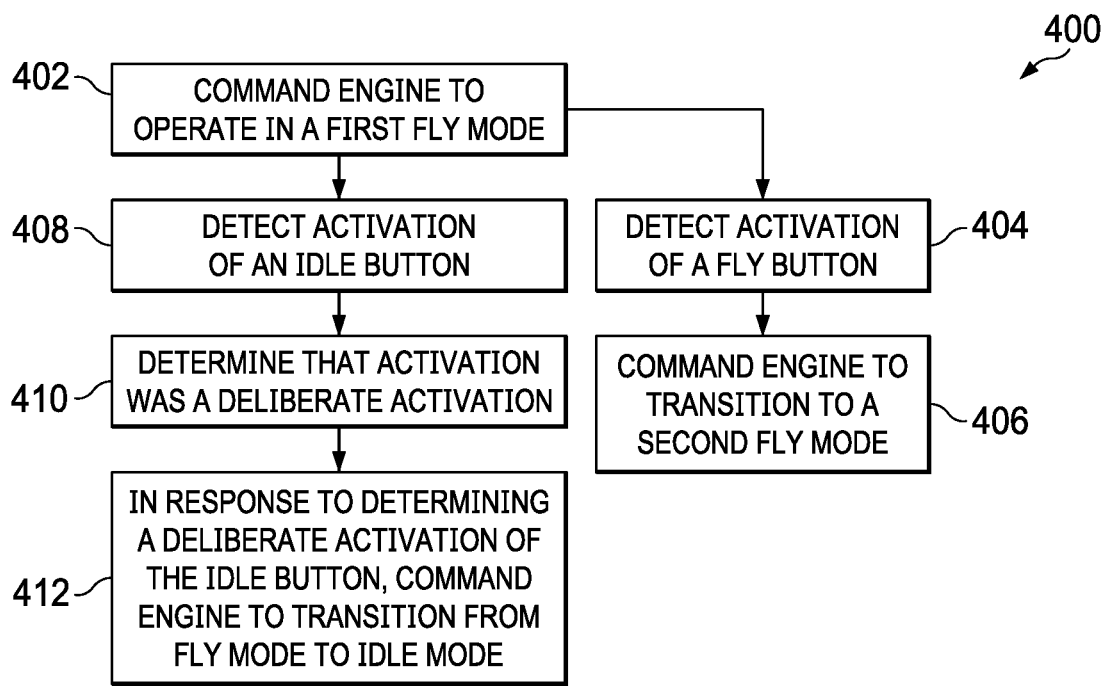
FIG. 6 is a flowchart illustrating a method of operating an aircraft while in a FLY mode according to an embodiment of this disclosure.

Referring to FIG. 6, a method 400 of controller 122 controlling engine 124 when engine 124 is operating in FLY mode will be described. At block 402, method 400 can begin by controller 122 commanding engine 124 to operate in FLY mode. For example, engine 124 may be performing FLY mode based on initial flight commands from TCA 200 or TCA 202. At block 404, method 400 can continue by detecting that TFB 208 has been activated. In embodiments where helicopter 100 only includes a single TCA 200, controller 122 can detect that Pilot 1 TFB 208 has been activated. In embodiments where helicopter 100 includes TCA 200 and TCA 202, controller 122 can detect that either Pilot 1 TFB 208 or Pilot 2 TFB 208 has been activated. At block 406, method 400 can continue by controller 122 commanding engine 124 to transition from FLY mode to a different FLY mode in response to detecting the activated TFB 208. For example, in response to detecting that a TFB 208 has been activated, controller 122 can control engine 124 to transition from a normal flight FLY mode to a FLY mode operating at a reduced RPM than the normal flight FLY mode. Accordingly, a pilot may sequentially progress through various FLY modes by continual activating TFB 208 while engine is already operating in a FLY mode. For example, continued detections of TFB 208 can result in controller 122 commanding engine to transition from a normal flight FLY mode through various continually reduced RPM FLY modes. Once the lowest RPM FLY mode is reached, controller 122 can command engine 124 to transition back to the normal flight FLY mode in response to detecting activation of TFB 208. At block 404, if controller 122 detects activation of both TFBs 208 (Pilot 1 TFB 208 and Pilot 2 TFB 208) substantially simultaneously, controller 122 can ignore the detected subsequent activation of either TFB 208, and only command engine 124 to transition to the next FLY mode, rather than commanding engine 124 to transition FLY modes twice (one transition for each detected TFB 208 activation).

At block 408, method 400 can continue from block 402 by controller 122 detecting activation of TIB 210. In embodiments where helicopter 100 only includes a single TCA 200, controller 122 can detect that TIB 210 of TCA 200 has been activated. In embodiments where helicopter 100 includes TCA 200 and TCA 202, controller 122 can detect that either Pilot 1 TIB 210 or Pilot 2 TIB 210 has been activated. At block 410, method 400 can continue by controller 122 determining that the activation of TIB 210 was a deliberate activation by the pilot. For example, in some embodiments, controller 122 will further determine if TIB 210 was pressed/activated for a sufficient amount of time by the pilot to be considered a deliberate activation of TIB 210, and not an accidental activation. In some embodiments, controller 122 can determine that an activation of TIB 210 was deliberate if controller 122 determines that TIB was pressed/activated by the pilot for at least approximately 0.25 seconds. At block 412, in response to detecting that the activation of TIB 210 was deliberate at block 410, method 400 can continue by controller 122 commanding engine 124 to transition from FLY mode to IDLE mode. If activation of TIB was not determined to be deliberate (or, said differently, the activation was determined to be accidental), controller 122 can command engine 124 to remain in FLY mode or otherwise disregard the ineffective activation. Transitioning to IDLE mode during flight can potentially be dangerous when performed in certain conditions, as the loss of flight producing rotation could lead to an accident. Thus, controller 122 determining that the activation is deliberate is critical, in that switching to IDLE mode in response to an accidental activation of TIB 210 could be dangerous.

In some embodiments where helicopter 100 is equipped with TCA 200 and 202, at blocks 408 and 410, controller 122 can detect substantially simultaneous deliberate activation of both TIBs 210 (activation of Pilot 1 TIB 210 and Pilot 2 TIB 210) and can ignore the detected subsequent activation of either TIB 210, and thereby continue to command engine 124 to operate in IDLE mode. Accordingly, in scenarios where Pilots 1 and 2 substantially simultaneously activate their respective TIBs 210, controller 122 can detect the first activated TIB 210 and command engine 124 to perform IDLE mode and ignore the subsequent activated TIB 210 so that engine 124 remains in IDLE mode.

Figure 7:
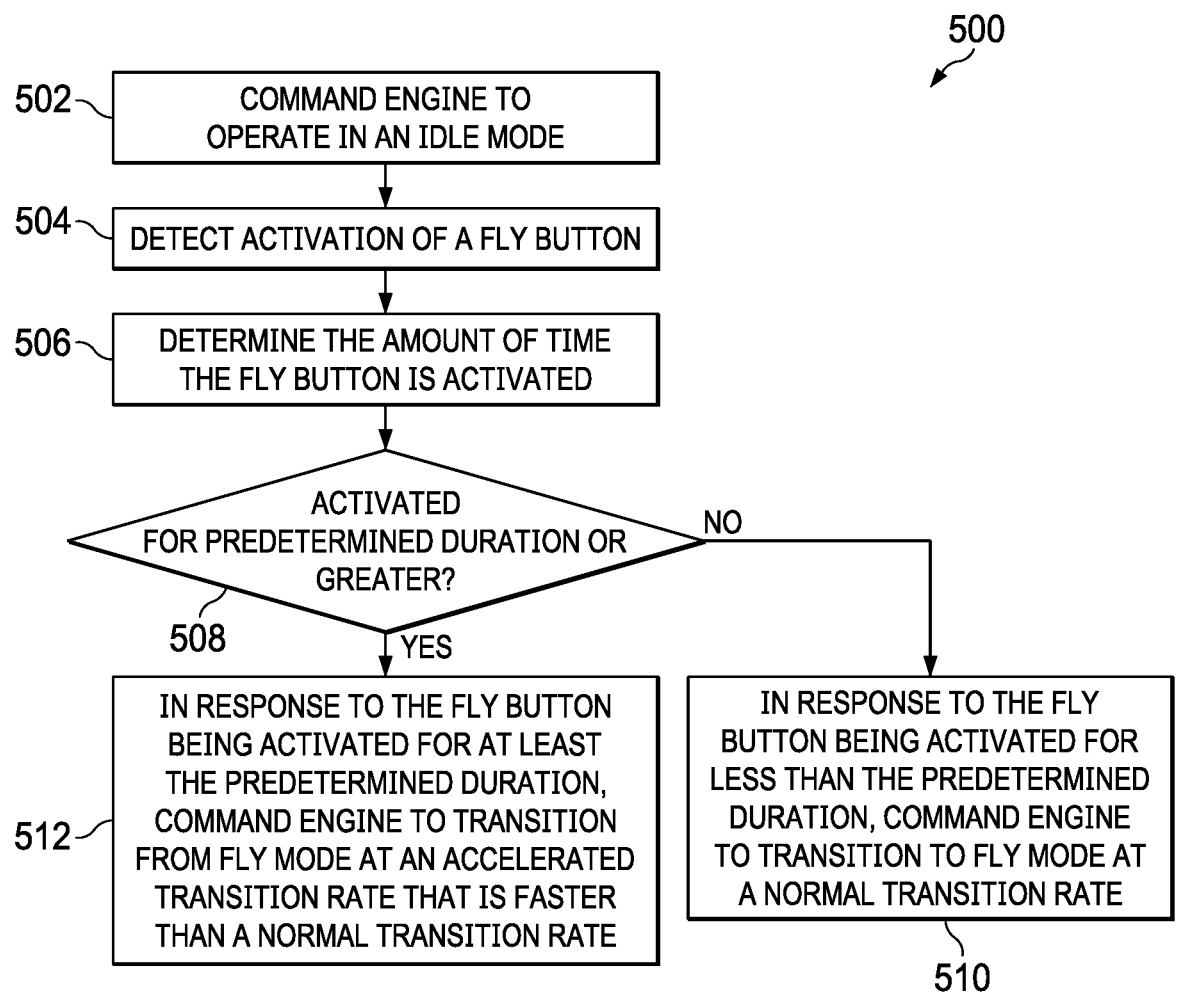
FIG. 7 is a flowchart illustrating a method of operating an aircraft while in an IDLE mode according to an embodiment of this disclosure.

Referring to FIG. 7, a method 500 of controller 122 controlling engine 124 when engine 124 is operating in IDLE mode will be described. At block 502, method 500 can begin by controller 122 commanding engine 124 to operate in IDLE mode. At block 504, method 500 can continue by controller 122 detecting activation of TFB 208. In embodiments where helicopter 100 only includes a single TCA 200, controller 122 can detect that TFB 208 of TCA 200 has been activated. In embodiments where helicopter 100 includes TCA 200 and TCA 202, controller 122 can detect that either Pilot 1 TFB 208 or Pilot 2 TFB 208 has been activated. In some embodiments, TFB 208 is activated by the pilot pressing TFB 208 for a predetermined amount of time. At block 506, method 500 can continue by controller 122 determining the amount of time that the pilot presses TFB 208. At block 508, method 500 can continue by controller 122 determining whether the amount of time TFB 208 is pressed for is greater than or equal to a predetermined duration. The predetermined duration may be a duration programmed into the controller 122 and may be able to be changed based on preferences of the pilot or helicopter operator. In response to determining that TFB 208 is pressed for less than the predetermined duration at block 508, method 500 can continue to block 510 and controller 122 can command engine to transition to FLY mode at a normal transition rate. In response to determining that TFB 208 is pressed for the predetermined duration or greater at block 508, method 500 can continue to block 512 and controller 122 can command engine 124 to transition to FLY mode at an accelerated transition rate faster than the normal transition rate. Accordingly, in scenarios in which the pilot wants to quicky transition from IDLE mode to FLY mode, the pilot can press the respective TFB 208 for a predetermined longer duration than a normal duration, thereby decreasing the time it takes for the engine to transition to FLY mode. In either blocks 510 or 512, when controller 122 is configured to command a plurality of FLY modes, controller 122 can transition engine 124 from IDLE mode to the most powerful FLY mode of the plurality of FLY modes. As previously discussed, transitioning from IDLE mode to the most powerful FLY mode is desirable so that maximum power is available for unforeseen events.

One with skill in the art will recognize that there are various scenarios in which the above-described capability can be beneficial. For example, helicopter 100 may be in a situation in which continued operation in IDLE mode could lead to undesirable operation and the pilot may want to quicky transition to FLY mode. In this scenario, the pilot would hold TFB 208 for longer than the predetermined duration to quicky transition to FLY mode. Additionally, the predetermined duration may be programmed to align with a pilot's instinctual reactions. For example, an operator of helicopter 100 may determine that in situations in which its pilots want to transition to FLY mode at a normal rate, the pilot may simply "click" TFB 208, while pilots may instinctively tend to "hold" TFB 208 in the pressed position in scenarios in which the pilot wants to quickly transition to FLY mode. Accordingly, the operator may program the predetermined duration to be approximately 0.5 second, so that a "click" of TFB 208 will be associated with a normal transition rate and anything longer will be associated with an accelerated transition rate. One with skill in the art will recognize that, in some embodiments, the predetermined duration may be more or less than 0.5 second.

Figure 8:
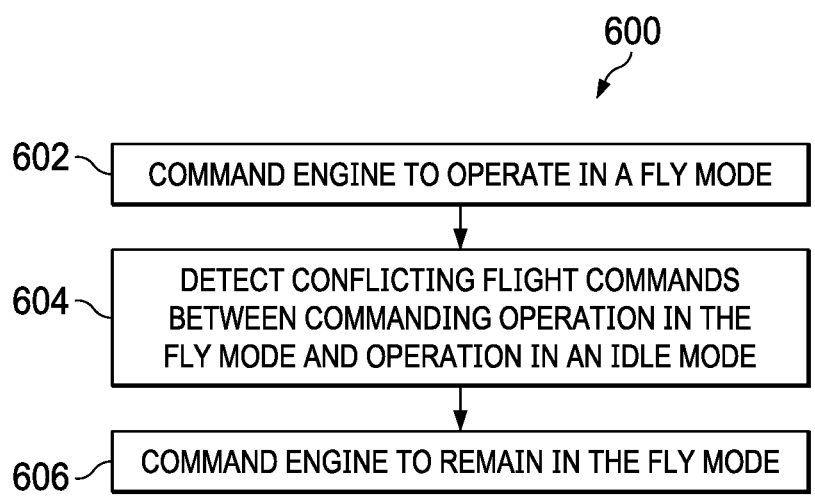
FIG. 8 is a flowchart illustrating a method of operating an aircraft in response to receiving conflicting commands while in a FLY mode according to an embodiment of this disclosure.

Referring to FIG. 8, a method 600 of operating engine 124 when conflicting commands are detected by controller 122 and engine 124 is in FLY mode is described. At block 602, method 600 can begin by controller 122 commanding engine 124 to operate in FLY mode. For example, as previously discussed, controller 122 may command engine 124 to operate in FLY mode based on detecting that one of the TFBs 208 was activated. At block 604, method 600 can continue by detecting substantially simultaneous conflicting flight commands. For example, controller 122 may detect that Pilot 1 TFB 208 was activated substantially simultaneously with Pilot 2 TIB 210. Likewise, controller 122 may detect that Pilot 1 TIB 210 was activated substantially simultaneously with Pilot 2 TFB 208. Accordingly, controller 122 may detect conflicting flight commands from TCA 200 and TCA 202. Additionally, controller 122 may detect conflicting flight commands from a same TCA, either TCA 200 or TCA 202. For example, controller 122 may detect that Pilot 1 TFB 208 was activated substantially simultaneously with Pilot 1 TIB 210 (that is, Pilot 1 activated TFB 208 and TIB 210 at substantially the same time). The amount of time that constitutes activations being detected at "substantially simultaneously" may be a value determined and programmed by an operator of helicopter 100. For example, in some embodiments, button activation detected within 1 second of each other can be determined by controller 122 to have occurred "substantially simultaneously." One with skill in the art will understand that controller may be programmed to determine that button activations occur "substantially simultaneously" at intervals more or less than 1 second. At block 606, based on making the detection at block 604, method 600 can continue at block 606 by controller 122 commanding engine 124 to remain in FLY mode. Accordingly, in response to controller 122 detecting conflicting flight commands while engine 124 is in FLY mode, controller 122 commands engine 124 to remain in FLY mode.

Figure 9:
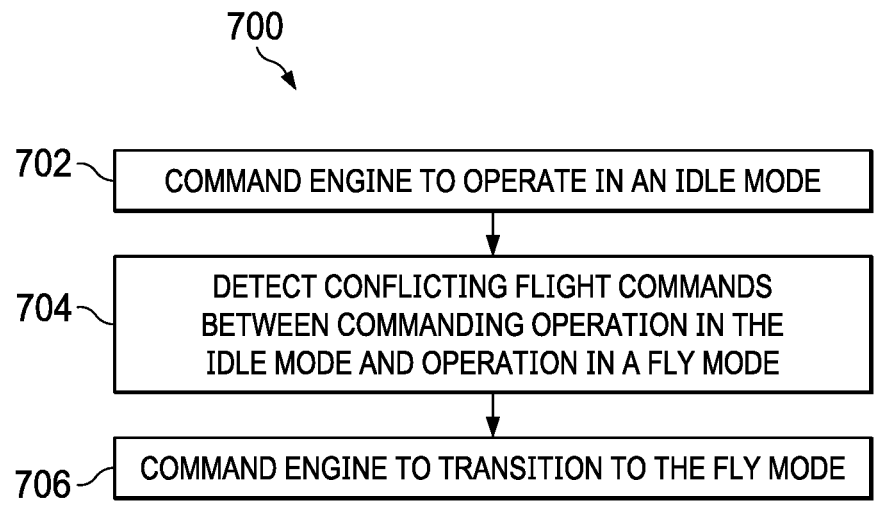
FIG. 9 is a flowchart illustrating a method of operating an aircraft in response to receiving conflicting commands while in an IDLE mode according to an embodiment of this disclosure.

Referring to FIG. 9, a method 700 of operating engine 124 when conflicting commands are detected by controller 122 and engine 124 is in IDLE mode is described. At block 702, method 700 can begin by controller 122 commanding engine 124 to operate in IDLE mode. For example, as previously discussed, controller 122 may command engine 124 to operate in IDLE mode based on detecting that one of the Ms 210 was activated. At block 704, method 700 can continue by detecting substantially simultaneous conflicting flight commands. controller 122 can detect conflicting flight commands in substantially the same ways discussed above in describing block 604. At block 706, based on making the detection at block 704, method 700 can continue by controller 122 commanding engine 124 to transition from IDLE mode to FLY mode. Accordingly, in response to controller 122 detecting conflicting flight commands in IDLE mode, controller 122 commands engine 124 to transition from IDLE mode to FLY mode.

Figure 10:
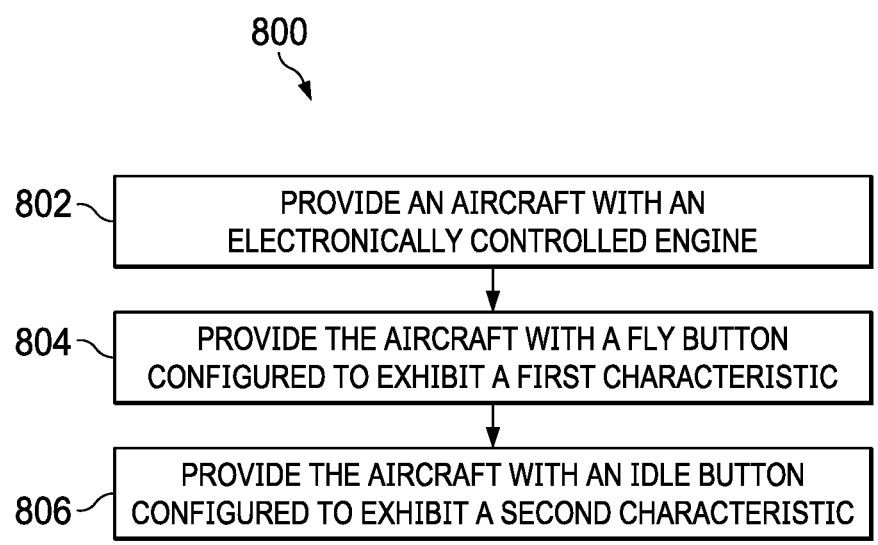
FIG. 10 is a flowchart illustrating a method of operating an aircraft according to an embodiment of this disclosure.

Referring to FIG. 10, a method 800 of operating helicopter 100 will be described. At block 802, method 800 can begin by providing helicopter 100 with an electronically controlled engine (ECE), such as engine 124 electronically controlled by controller 122. At block 804, method 800 can continue by providing helicopter 100 with a fly button, such as TFB 208, configured to exhibit a first characteristic. At block 806, method 800 can continue by providing helicopter 100 with an idle button, such as TIB 210, configured to exhibit a second characteristic different than the first characteristic. The first and second characteristics exhibited by TFB 208 and TIB 210 can relate to any of a number of characteristics. In some embodiments the first and second characteristics can relate to a button depression force. For example, as previously discussed, TFB 208 can be configured to resist depression with a first force and TIB 210 can be configured to resist depression with a second force greater than the first force. In some embodiments, the first and second characteristics can relate to other tactile characteristics, such as TIB 210 having a different clicking feeling than TFB 208, or TIB 210 causing a vibratory response when activated. In some embodiments, the first and second characteristics can relate to audible information directed to the pilot. For example, in some embodiments, activation of TIB 210 can cause a sound system of helicopter 100 to create a tone, alarm, chime, or message that is audible to the pilot and indicates activation of TIB 210. Similarly, in some embodiments, activation of TFB 208 can cause the sound system to create a tone, alarm, chime, or message that is audible to the pilot and indicates activation of TFB 208. In some embodiments, the first and second characteristics can relate to selectively restricting access to TFB 208 and TIB 210. For example, as previously discussed, TIB 210 can include guard 211 configured to selectively restrict access to TFB 210, while TFB 208 can be free from any access-restricting device.

Referring now to Table 1, a table showing a variety of system responses in response to certain operator actions under certain conditions is shown.

TABLE 1

System response to certain operator action under certain conditions

| Condition | Operator Action | System Response |
|---|---|---|
| Detect activation of either TIB is detected while in FLY mode | Either Pilot 1 or 2 presses TFB to recover. | Controller commands engine to IDLE mode upon TIB activation and returns to FLY mode upon TFB activation |
| Detect conflicting inputs from Pilots 1 and 2 while in FLY mode | | Controller commands engine to remain in FLY mode |
| Tail rotor failure while in FLY mode | Either Pilot 1 or 2 activates TIB for approximately 0.25 seconds | Controller commands engine to transition from FLY mode to IDLE mode |
| Tail rotor failure while in FLY mode | Either Pilot 1 or 2 substantially simultaneously activates TIB and TFB | Controller commands engine to remain in FLY mode |
| Tail rotor failure while in FLY mode | Pilots 1 and 2 activate conflicting FLY/IDLE inputs | Controller commands engine to remain in FLY mode |

Table 1 illustrates how controller 122 can perform methods 300, 400, 500, 600, 700, and 800 in various real-world conditions. For example, Table 1 illustrates how the previously-described methods can be used when one or both Pilots 1 and 2 is/are attempting to activate IDLE mode in response to a loss of function of tail rotor 112. One with skill in the art will understand that methods 300-800 can be performed under various real-world conditions and that Table 1 only illustrates some of the real-world conditions in which methods 300-800 can be used.

Figure 11:
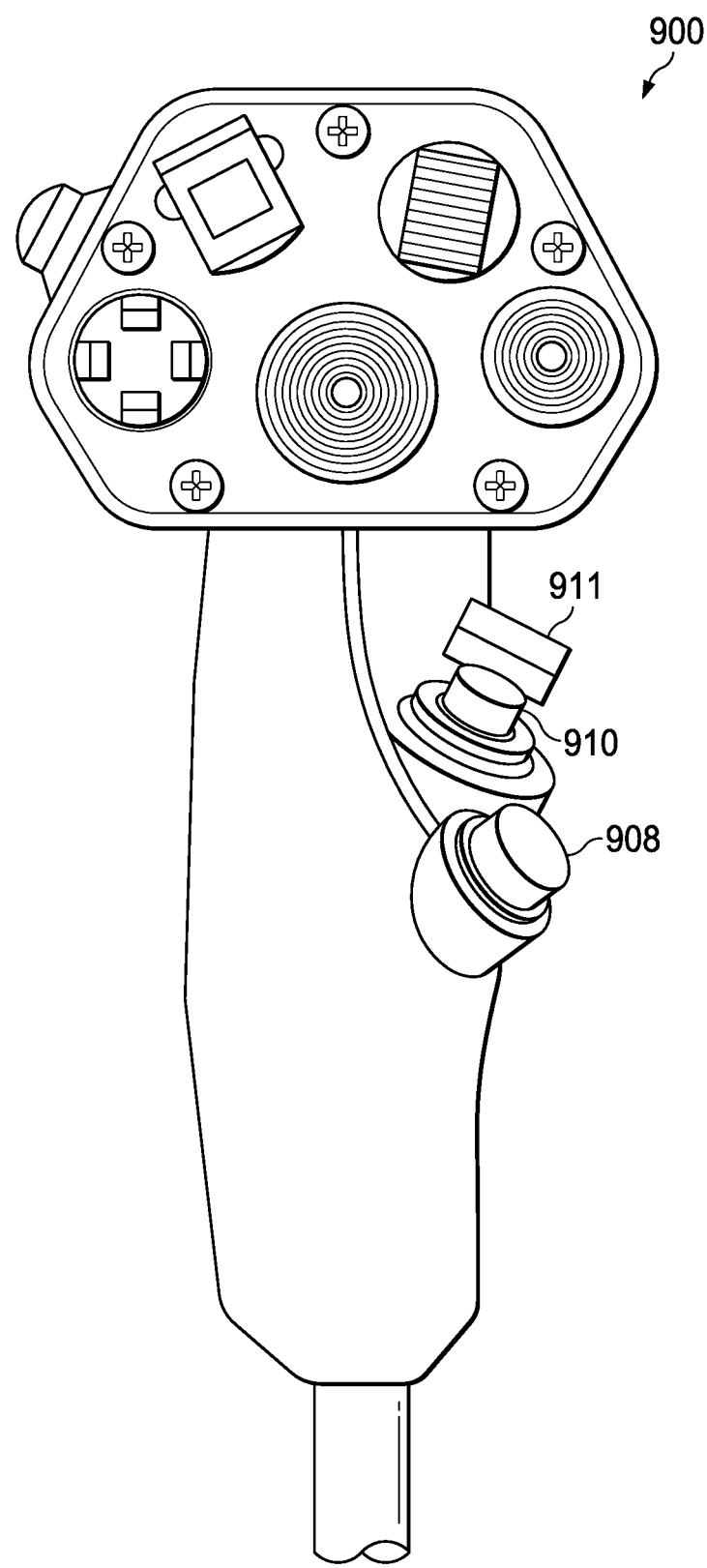
FIG. 11 is an orthogonal front view of an alternative embodiment of a collective control stick mounted throttle control assembly.

Referring now to FIG. 11, an orthogonal front view of an alternative embodiment of a collective control stick mounted throttle control assembly 900 is shown. TCA 900 is substantially similar to TCA 200 insofar as it comprises TFB 908 and TIB 910 that are substantially similar to TFB 208 and TIB 210, but TCA comprises a different protective cover 911.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. An aircraft, comprising:
   an electronically controlled engine (ECE);
   a first throttle fly button configured to command a FLY mode; and
   a first throttle idle button configured to command an IDLE mode;
   wherein when the ECE is performing the IDLE mode, transition to the FLY mode is initiated at a rate dependent on how long the first throttle fly button is activated.

2. The aircraft of claim 1, wherein when the ECE is performing the FLY mode, the ECE is configured to perform the IDLE mode in response to detecting that the first throttle idle button has been activated.

3. The aircraft of claim 1, wherein when the ECE is performing the IDLE mode, the ECE is configured to transition to the FLY mode in response to detecting that the first throttle fly button has been activated.

4. The aircraft of claim 1, wherein:
   the first throttle fly button is further configured to command a plurality of FLY modes; and
   when the ECE is performing one of the plurality of FLY modes, the ECE is configured to perform another of the plurality of FLY modes in response to detecting that the first throttle fly button has been activated.

5. The aircraft of claim 1, wherein when the ECE is performing the IDLE mode:
   the ECE is configured to transition to the fly mode at a normal transition rate in response to detecting that the first throttle fly button has been activated by being pressed for less than a predetermined amount of time; and
   the ECE is configured to transition to the fly mode at an accelerated transition rate in response to detecting that the first throttle fly button has been activated by being pressed for the predetermined amount of time or greater than the predetermined amount of time.

6. The aircraft of claim 1, wherein, in response to detecting that the first throttle fly button and the first throttle idle button being activated simultaneously, the ECE is configured to perform the FLY mode.

7. The aircraft of claim 1, further comprising:
   a second throttle fly button configured to initially command the FLY mode; and
   a second throttle idle button configured to command the IDLE mode,
   wherein the first throttle fly button and the first throttle idle button are carried by a first throttle control assembly, and
   wherein the second throttle fly button and the second throttle idle button are carried by a second throttle control assembly.

8. The aircraft of claim 7, wherein:
   when the ECE is performing the FLY mode, the ECE is configured to continue to perform the FLY mode in response to detecting simultaneous conflicting commands from the first throttle control assembly and the second throttle control assembly, and when the ECE is performing the IDLE mode, the ECE is configured to transition to the FLY mode in response to detecting simultaneous conflicting commands from the first throttle control assembly and the second throttle control assembly.

9. The aircraft of claim 1, wherein:
the first throttle fly button and the first throttle idle button are carried by a first throttle control assembly; and
the first throttle control assembly comprises a button guard configured to selectively restrict access to the first throttle idle button.

10. The aircraft of claim 1, wherein:
the first throttle fly button is configured to resist depression with a first resisting force; and
the first throttle idle button is configured to resist depression with a second resisting force greater than the first resisting force.

11. A method of operating an aircraft, the method comprising:
providing the aircraft with an electronically controlled engine (ECE);
providing the aircraft with a first throttle fly button configured to initially command a FLY mode; and
providing the aircraft with a first throttle idle button configured to command an IDLE mode;
transitioning to the FLY mode at a rate selected as a function of how long the first throttle fly button is activated.

12. The method of claim 11, further comprising, based on the ECE performing the FLY mode:
detecting activation of the first throttle idle button; and
commanding the ECE to transition from the FLY mode to the IDLE mode.

13. The method of claim 11, further comprising, based on the ECE performing the IDLE mode:
detecting activating the first throttle fly button; and
commanding the ECE to transition from the IDLE mode to the FLY mode.

14. The method of claim 11, wherein:
the first throttle fly button is further configured to command a plurality of FLY modes; and
the method further comprises, based on the ECE performing one of the plurality of FLY modes:
detecting activation of the first throttle fly button; and
commanding the ECE to transition to another of the plurality of FLY modes.

15. The method of claim 11, further comprising, based on the ECE performing the IDLE mode:
detecting that the first throttle fly button has been pressed to activate the first throttle fly button;
determining an amount of time the first throttle fly button was pressed;
commanding the ECE to transition from the IDLE mode to the fly mode at a normal transition rate in response to determining that the first throttle fly button was pressed for less than a predetermined amount of time; and
commanding the ECE to transition from the IDLE mode to the fly mode at an accelerated transition rate in response to determining that the first throttle fly button was pressed for the predetermined amount of time or greater than the predetermined amount of time.

16. The method of claim 11, further comprising:
detecting that the first throttle fly button and the first throttle idle button have been activated simultaneously; and
commanding the ECE to perform the FLY mode.

17. The method of claim 11, further comprising:
providing a second throttle fly button configured to initially command the FLY mode;
providing a second throttle idle button configured to command the IDLE mode;
carrying the first throttle fly button and the first throttle idle button with a first throttle control assembly of the aircraft; and
carrying the second throttle fly button and the second throttle idle button with a second throttle control assembly of the aircraft.

18. The method of claim 17, wherein:
based on the ECE performing the FLY mode, the method further comprises:
  (a) detecting simultaneous conflicting commands from the first throttle control assembly and the second throttle control assembly; and
  (b) commanding the ECE to continue to perform the FLY mode in response to the detection step (a), and
based on the ECE performing the IDLE mode, the method further comprises:
  (c) detecting simultaneous conflicting commands from the first throttle control assembly and the second throttle control assembly; and
  (d) commanding the ECE to perform the FLY mode in response to the detection in step (c).

19. The method of claim 11, further comprising:
carrying the first throttle fly button and the first throttle idle button with a first throttle control assembly; and
selectively restricting access to the first throttle idle button with a button guard of the first throttle control assembly.

20. The method of claim 11, wherein:
the first throttle fly button is configured to resist depression with a first resisting force; and
the first throttle idle button is configured to resist depression with a second resisting force greater than the first resisting force.

* * * * *